United States Patent
Eidson

(10) Patent No.: US 7,885,350 B1
(45) Date of Patent: Feb. 8, 2011

(54) SYSTEM AND METHOD FOR NON-INTERFERING SIGNALING AND RECEPTION OF OVERLAPPING SINGLE CARRIER TRANSMISSIONS OVER DELAY SPREAD CHANNELS

(76) Inventor: Donald Brian Eidson, 9115 Judicial Dr., #4516, San Diego, CA (US) 92122

( * ) Notice: Subject to any disclaimer, the term of this patent is extended or adjusted under 35 U.S.C. 154(b) by 1266 days.

(21) Appl. No.: 11/239,657

(22) Filed: Sep. 28, 2005

Related U.S. Application Data

(60) Provisional application No. 60/623,303, filed on Oct. 28, 2004.

(51) Int. Cl.
*H04L 27/04* (2006.01)
*H04L 27/06* (2006.01)
(52) U.S. Cl. .................. 375/295; 375/316; 375/343
(58) Field of Classification Search .......... 375/143, 375/144, 146–148, 152, 259, 262, 265, 295, 375/302, 316, 332, 340, 341, 343
See application file for complete search history.

(56) References Cited

U.S. PATENT DOCUMENTS

| | | | | |
|---|---|---|---|---|
| 2002/0118765 | A1* | 8/2002 | Nangia et al. | 375/260 |
| 2003/0161487 | A1* | 8/2003 | Husted et al. | 381/94.5 |
| 2005/0163258 | A1* | 7/2005 | Gore et al. | 375/340 |
| 2007/0189404 | A1* | 8/2007 | Baum et al. | 375/260 |

OTHER PUBLICATIONS

IEEE Compute Society and the IEEE Microwave Theory and Techniques Society: "802.16 IEEE Standard for Local and Metropolitan Area Networks, Part 16: Air Interface for Fixed Broadband Wireless Access Systems" Oct. 1, 2004, IEEE, New York, USA, XP002370132, p. 385-p. 390.

* cited by examiner

*Primary Examiner*—Young T. Tse

(57) ABSTRACT

A signaling approach using block repetition and phase ramping that is robust and enables multi-user communication with higher order modulations over multipath channels, coupled to a receiving approach in the time domain that utilizes phase de-ramping, block averaging and equalization.

24 Claims, 8 Drawing Sheets

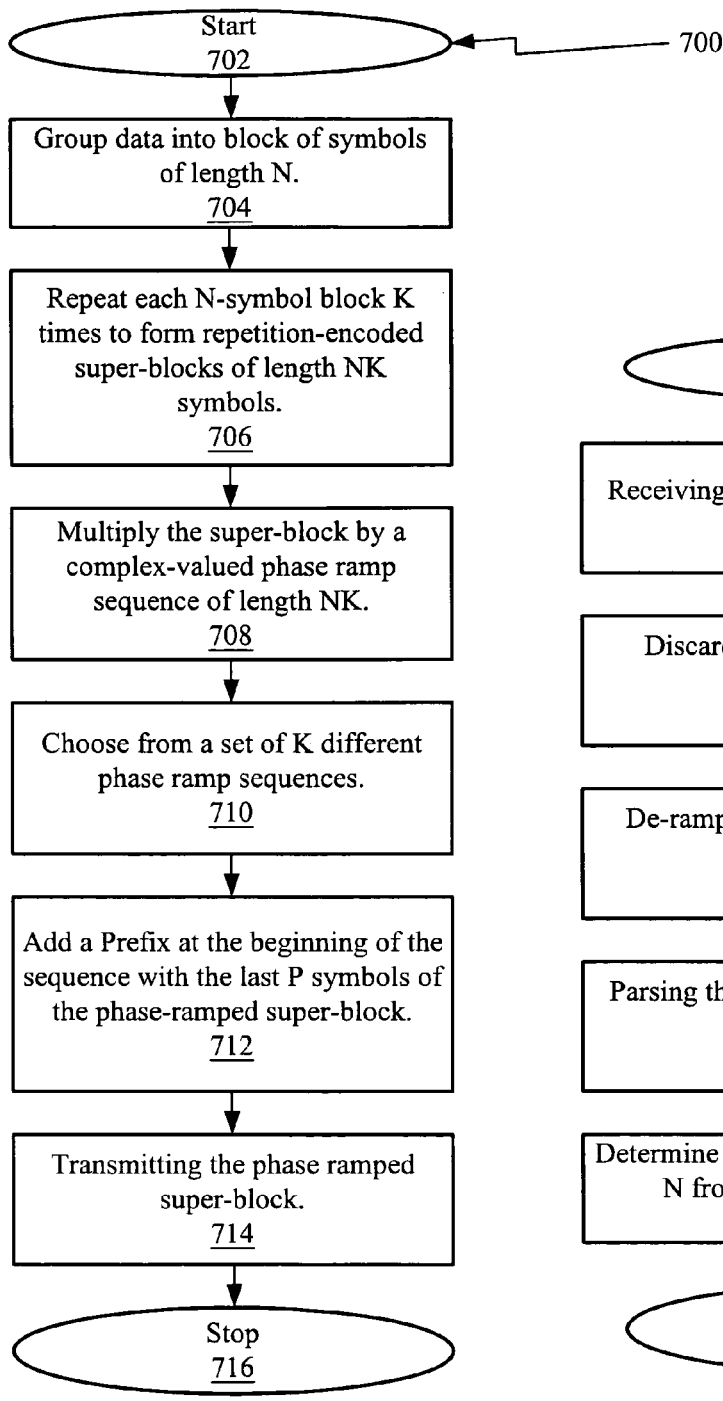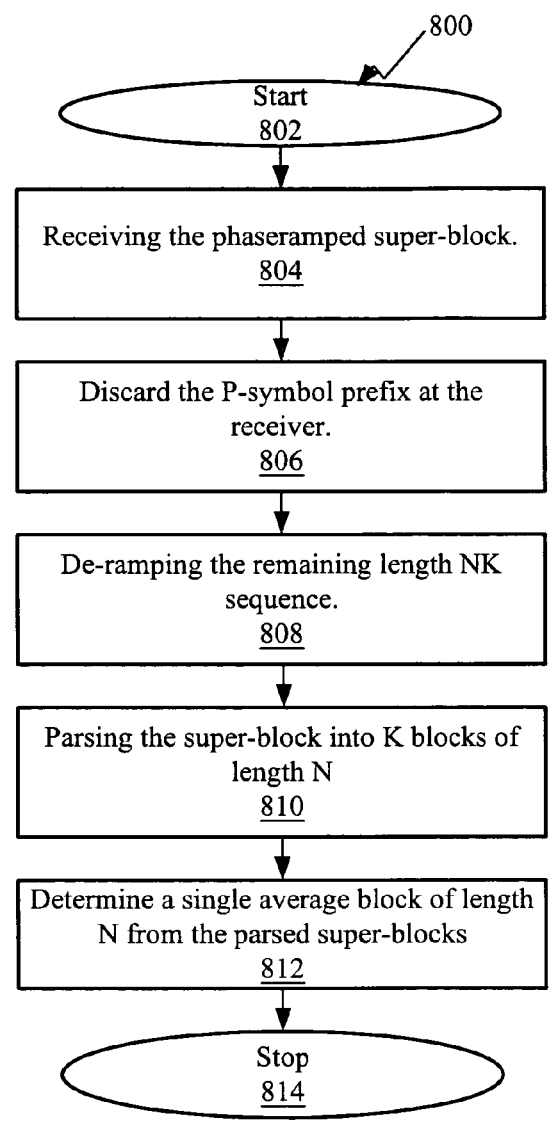
*FIG. 7*
*FIG. 8*

SYSTEM AND METHOD FOR NON-INTERFERING SIGNALING AND RECEPTION OF OVERLAPPING SINGLE CARRIER TRANSMISSIONS OVER DELAY SPREAD CHANNELS

CROSS REFERENCE TO RELATED APPLICATIONS

This application claims priority under Section 119(e) to U.S. Provisional Application Ser. No. 60/623,303, titled "A System and Method for Non-Interfering Signaling and Reception of Overlapping Single Carrier Transmission over Delay Spread Channels," filed Oct. 28, 2004, which is incorporated into this application by reference in its entirety.

BACKGROUND OF THE INVENTION

1. Field of Invention

This invention relates to wireless devices, and in particular to wireless devices utilizing the IEEE 802.16 standard.

2. Related Art

With the explosive growth of wireless technologies there is a growing desire to deploy wireless connectivity over larger areas, such as cities and rural areas, as an alternative to using copper and fiber-based solutions. Wireless technologies are typically less expensive to install and support in most cases, especially in locations where the cost is prohibitive to install physical media or there are right-of-way issues.

The problem, however, is that there have not been effective, standards-based solutions for implementing wireless networks within metropolitan-sized areas. Traditionally, companies install proprietary or Institute of Electrical and Electronics Engineers ("IEEE") 802.11 (generally known as "802.11") equipment for wireless connectivity over areas outside the confines of a building. Proprietary systems may typically meet performance and security requirements; however, they tend to be more expensive and risky in terms of long-term support. They also lack interoperability, something that many end users typically demand.

The use of IEEE 802.11-based hardware for metropolitan-sized networks usually decreases costs, but the IEEE 802.11 standard has performance limitations when supporting large numbers of users who need guaranteed bandwidth. In addition, RF interferences are often a significant problem in IEEE 802.11 networks when covering large areas due to license free operation of other devices within the same frequency bands. Often a competitor may install an IEEE 802.11 based network that interferes with other networks, and users suffer due to sporadic, poor performance.

In response to these and other problems, the IEEE 802 group initiated the IEEE 802.16 Working Group to create standards for broadband wireless access in order to offer a high speed/capacity, low cost, and a scalable solution to extend fiber optic backbones. The first IEEE Standard 802.16®, published in April 2002, defines the Wireless-MAN™ Air Interface for wireless metropolitan area networks ("MANs"). These systems were meant to provide network access to homes, small businesses, and commercial buildings as an alternative to traditional wired connections.

The IEEE Standard 802.16® (generally known as "802.16") will support point-to-multipoint architecture in the 10-66 GHz range, transmitting at data rates up to 120 Mbps with transmissions requiring line-of-sight (also generally known as "line-of-site"). Typically an IEEE 802.16 base station connects to a wired backbone and can transmit wirelessly up to 30 miles to a large number of stationary subscriber stations, possibly hundreds.

To accommodate non-line-of-sight access over lower frequencies, the IEEE published IEEE 802.16a in January 2003. The IEEE 802.16a standard operates in the licensed and unlicensed frequencies between 2 GHz and 11 GHz, and defines three optional Physical Layers ("PHYs"), two using orthogonal frequency division multiplexing ("OFDM"), and one using a single carrier. Additionally, the IEEE 802.16 media access control ("MAC") layer supports many different physical layer specifications, both licensed and unlicensed. Through the IEEE 802.16 MAC layer, every base station may be able to dynamically distribute uplink and downlink bandwidth to subscriber stations using time-division multiple access ("TDMA"). This is a difference from the IEEE 802.11 MAC, with current implementations operating through the use of carrier sensing mechanisms that do not provide effective bandwidth control over the radio link.

In the spring of 2003, one need identified by the IEEE 802.16revD working group was the need to increase the range of the uplink (the communication channel over which subscriber units transmit to a base station), especially for mobile operations. In response to this, communication engineers working on the IEEE 802.16revD WirelessMAN-SCa physical layer set a goal of adding functionality to increase both the range and data-carrying capacity of the baseline single-carrier (time-domain modulated) broadband wireless communication system. Severe constraints were placed on the total output power of subscriber units due to the cost of semiconductor power amplifiers and batteries; therefore, throwing additional power at the problem was not an acceptable solution.

A conventional systems-oriented approach to this problem is to divide the usable uplink bandwidth into narrower bandwidth channels, and allocate a single channel to each user. By funneling the output power of each transmitter into a narrower bandwidth channel (i.e., a narrower communication pipe), the energy per bit (i.e., pressure within a communication pipe) is increased. This, in turn, increases the range (of effective communication flow) on the channel, because it can compensate for extra propagation losses. Moreover, multiple users can be supported without interference by assigning each user to its own narrowband channel. Reducing interference then increases capacity because it enables higher order modulations, such as 64-QAM, to be used when adequate signal-to-noise ratio ("SNR") is available.

Unfortunately, characteristics (and usage) of terrestrial wireless channels often either prohibit or limit the effectiveness of simply narrowing channel bandwidth. For example, in many unlicensed bands, one must re-use (time share) the same channel for the uplink (subscriber unit to base station channel) and downlink (base station to subscriber unit channel). Moreover, even if the bandwidths could be different on the uplink and downlink, a narrowband wireless channel is much more prone to signal-to-noise fluctuations called fading. Such fades are a consequence of multi-path propagation in a wireless environment. For example, if a version of a sinusoid (at a particular frequency) arrives 180 degrees out of phase with another delayed, reflected version of itself, the signals then cancel, and the SNR is minus-infinity. Broaderband signals tend to suffer less from fading because they are not simple sinusoids; they have enough frequency diversity such that only certain frequency ranges of their signaling spectrum are notched out in the worst case. The fading margin between narrowband and broadband channels can be in the tens of decibels so broadband signaling is typically preferred.

Previous attempted solutions applied to single carrier modulation include Code Division Multiple Access ("CDMA") and frequency hopping.

Some 2nd generation and all 3rd generation cellular telephony standards use CDMA. Cellular CDMA utilizes a technique called direct sequence spread spectrum ("DSSS") to take a narrowband signal, multiply it by a broadband (but known) 'chipping' sequence, and transmit the resulting broadband signal over a channel. Since DSSS uses a great deal of bandwidth to transmit a narrowband signal (and is therefore is spectrally very inefficient), cellular CDMA allows multiple transmitters to simultaneously access the channel by assigning each its own channelizing code, typically called a Walsh code. As a result, CDMA therein has several disadvantages:

1) Even with CDMA's spreading and Walsh code orthogonalization sequences, maintaining orthogonality over all delays in a multipath environment is impossible. As a result, multipath causes individual users to interfere with themselves, creating a 'self-noise floor'.

2) Due to delay spread and time-synchronizing issues, simultaneous users interfere with each other, creating multiple access interference ("MAI"). Unfortunately, MAI is generated even if users are assigned separate orthogonal Walsh codes.

3) To reduce the impact of MAI, tight power control is necessary in a CDMA system, so that no one transmitter produces interference that would overwhelm the reception of transmissions from other users. Unfortunately, power control messages can consume a considerable amount of system capacity.

4) Multipath-related self-interference and MAI generally restricts signaling to only lower order modulations (e.g., bipolar phase shift keying ("BPSK") and quadrature phase shift keying ("QPSK")). When higher throughputs are required, 3G cellular systems using CDMA typically dedicate the entire user bandwidth to a single user. As a result, this severely reduces system capacity.

5) The Rake receiver typically used in CDMA implementations are too complicated for true broadband channels (of several MHz to several ten's of MHz), where a Rake receiver would have to resolve many multipath signals, each requiring a separate 'Rake finger'.

Other transmission schemes such as Bluetooth® (IEEE 802.15) and the European cellular standard GSM are examples of systems using frequency hopping ("FH"). A FH transmitter funnels its energy into a narrowband channel, but continually hops from one narrowband channel to another, so that it never resides for long on a channel that may be faded. The problem with this scheme is if the receiver hops onto a low SNR channel, its demodulation loops fail, and the data received at that frequency is unusable. To overcome outages due to lost data at bad hop frequencies, low forward error correction ("FEC") code rates are necessary, and throughputs are subsequently low. Tight time and frequency accuracy are also required if multiple users are to operate simultaneously (with different hopping patterns) and not collide on one of the frequencies at the receiver.

Another problem with this scheme is the excessive signaling overhead required by FH. This is due to all of the guard bands and training sequences that FH requires at each hop, to 'learn' the channel and avoid other users. Additionally, demands on dynamic range and the speed of a receiver's carrier tracking and automatic gain control ("AGC") loops can also create difficulties because the receiver must immediately 'acquire' hop channels. Moreover, a base station receiving frequency-hopped transmissions must either implement a frequency-agile radio for each user (e.g., Bluetooth® or a GSM subscriber unit) or a bank of receivers for each hopping frequency (e.g., a GSM base station). It is appreciated by those skilled in the art that either implementation would be expensive if one wants to support multiple users. Because of the aforesaid and other reasons, European Telecommunication Standards Institute ("ETSI") adopted a CDMA approach for European 3G cellular over the frequency hopping approach used by GSM for 2G cellular.

Therefore, there is a need for a technique that would enable IEEE 802.16 single carrier systems and other single carrier systems to benefit from the power concentration of a narrowband signal, while still retaining the full bandwidth and frequency diversity of a broadband signal. In addition, unlike CDMA, the desired solution would support multiple simultaneous but non-interfering transmissions that might use higher order quadrature amplitude modulation ("QAM") modulations.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 7 is a flow diagram of encoding and transmission of an encoded signal using the encoding of FIGS. 1-3.

FIG. 8 is a flow diagram of an example of an implementation of reception of the encoded signal using the decoding described in FIG. 4.

DETAILED DESCRIPTION

Figure 1:
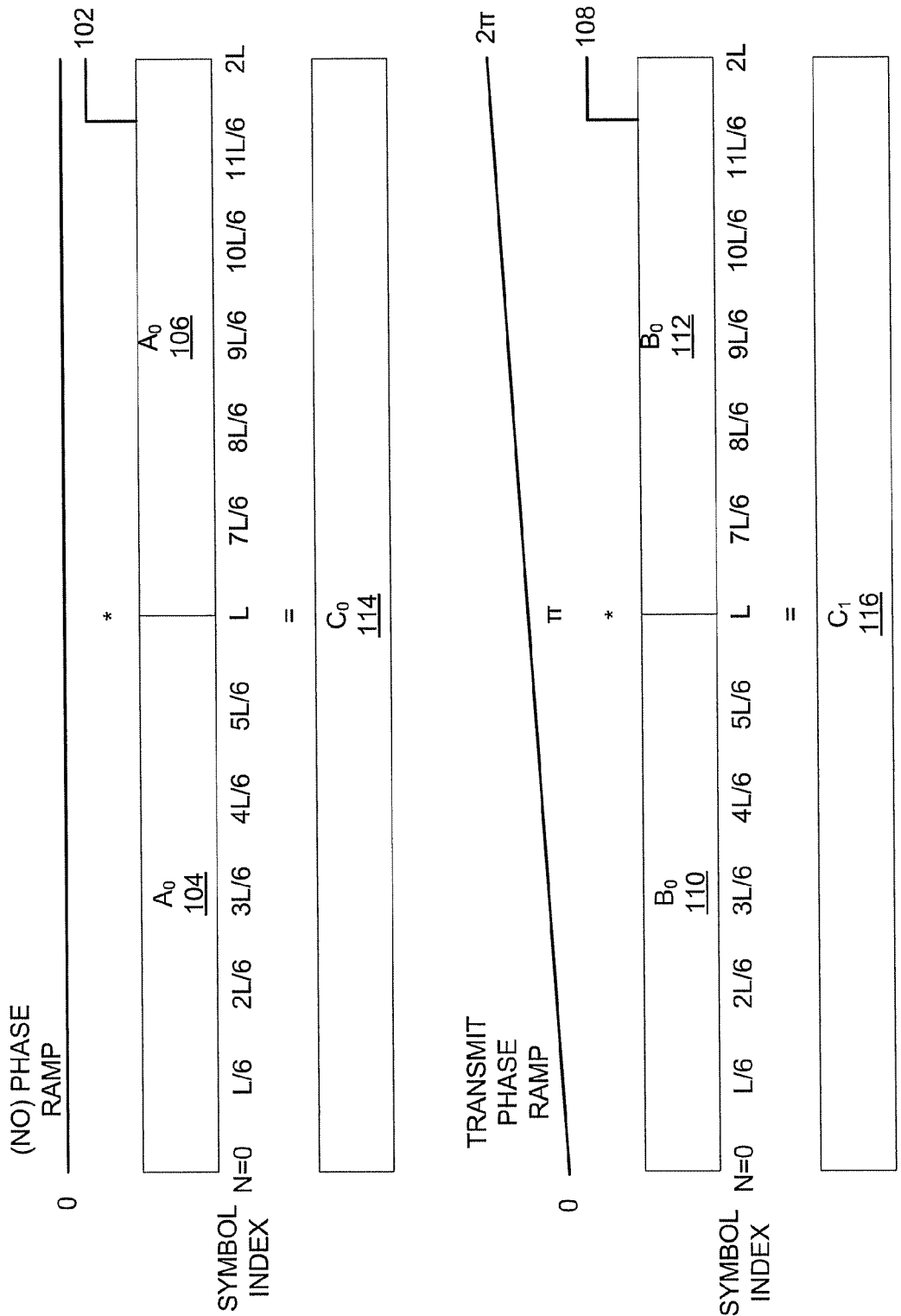
FIG. 1 shows two example transmissions; one formed from block $A_0$ repeated twice, the second formed from block $B_0$ repeated twice.

In the following description, reference is made to the accompanying drawings that form a part hereof, and which show, by way of illustration, a specific implementation in which the invention may be practiced. Other examples of implementations may be utilized and structural changes may be made without departing from the scope of the present invention.

The described signaling technique of using non-interfering signaling and overlapping single carrier transmissions over delay spread channels allows up to K blocks of signals, simultaneously transmitted—but potentially from different sources—to be separated and decoded at one or more receivers, without interference between the K signals. Each signal spans the full signaling bandwidth, and is therefore much less susceptible to fading than K narrowband signals. This technique also provides 10 log$_{10}$ (K) of 'repetition coding gain' when compared to other broadband transmissions that do not use the encoding technique.

As an example, transmission processing may begin by grouping data into blocks of symbols of length L. Each L-symbol block is repeated K times, to form repetition-encoded 'super-blocks' of length LK symbols. Each super-block is multiplied by a complex-valued phase ramp sequence of length LK. A choice may be made from a set of K different phase ramp sequences; each phase ramp sequence consists of samples that lie on a unit circle (in the complex plane). The m$^{th}$ phase ramp sequence m={0, . . . , K−1} in the phase ramp set of sequences has value $e^{j(2\pi mn)/(LK)}$ for symbols n={0, 1, . . . , LK−1} in the sequence.

In this example, subchannelization may also be employed. A number of subchannels may be predefined between the receiver and transmitter at the base station. The transmitter assigns a subchannel number for use by the receiver (i.e., the user) and based on that subchannel number, the receiver is able to calculate and/or determine a burst profile from the subchannel number. With the burst profile, the receiver then determines which modulation scheme to employ. The burst profile may contain the number of symbol blocks to repeat and the number of times for repetition, in addition to the phase ramp sequences. Thus, the base station controls who may access the uplink.

The subchannelization of the channels reduces the number of buffers in memory to the number of subchannels occupied. Thus, if three subchannels are assigned or occupied, then only three buffers are required for processing. This is opposed to other approaches that use fast-Fourier transforms that require buffers beyond the number of subchannels that are occupied.

A prefix sequence consisting of the last P symbols of the phase-ramped super-block may be prefixed to the beginning of the phase ramp sequence when intending to send the transmission sequence over a multipath communication channel.

At the receiver, the P-symbol prefix (if used) is removed or ignored and the remaining length LK sequence is phase de-ramped by multiplying it by the same phase ramp sequence that was used at the transmitter. The 'super-block' is then parsed into K blocks, of length L. These length-L blocks are then block-averaged and collectively summed symbol-wise, to form a single 'average' block of length L. Equalization may be needed at the receiver to compensate for delay spread distortion, this equalization being applied post-block-averaging. The processing results in a facsimile of the originally transmitted block, before it was replicated K times.

Applying equalization post-block-averaging reduces the complexity of signal processing by a factor of K, and also enables the signal processing to be performed at an SNR that is K times higher than if it were applied pre-block-averaging. This SNR amplification also enables the application of decision feedback equalization, which can be several dB superior to linear equalization. Introduction of a known 'unique word' ("UW") sequence into the L-symbol payload block (pre-repetition) may provide initialization information that a decision feedback equalizer may require for each block.

As a result of the complex phase ramp sequences, K different senders can simultaneously transmit with no interference—even over delay spread channels—if the described receiver processing is used. Generally, this is true if the sender uses a different ramp sequence and the channel delay spread and timing uncertainty among the simultaneous transmissions is less than the length P of the prefix sequence.

Although in this example, the starting phase for a ramp sequence starts at zero, it is appreciated by those skilled in the art that the actual starting phase for the ramp sequence is unimportant. Generally, a channel may introduce a carrier phase offset, without affecting the receiver performance. However, in order to achieve low interference levels, the relative frequency accuracy of simultaneously transmitting subscribers should be tight over the length of overlapped blocks. This may be maintained if access to a calibration signal, such as a broadcast downlink signal is available. All subscriber units can lock onto the downlink signal, and compensate their uplink transmitter frequency offsets accordingly.

Full diversity may be achieved by transmitting the time symbols over the full bandwidth with the blocks being longer than the spread of the channel. In other words, it is unlikely to fade out all of the subcarriers and a full degree of diversity of the channel is achieved. This approach may be also used for non-broadcast messages on a downlink—as long as access to a common reference signal to calibrate frequency is also available.

In this example, IEEE 802.16 frame formatting is employed. Details on the IEEE 802.16 frame formatting are available in the IEEE 802.16revD draft standard specification, which is incorporated by reference herein and includes:

a) descriptions of preamble structures that enable initial estimation of channel responses of overlapped transmissions (so that equalization, symbol timing, and carrier phase estimation may be performed on signal components received from different sources);

b) a specific access method for enabling multiple users to partially or fully overlap transmissions;

c) a method by which $2^n \leq K$ integer multiples of channels may be aggregated and assigned to a single transmitter without increasing the peak-to-average-power requirements of a power amplifier (this enables the assignment of different 'spreading factors' to different users while allowing these users to overlap in time); and d) the design and transmission of orthogonal preambles for an advanced antenna array system.

The following figures illustrate an example of an implementation where payloads from two sources (each payload consisting of one block) are multiplexed, and then separated without interference at a receiver. For simplicity, the complications of cyclic prefixes and delay spread are not illustrated.

In FIG. 1, two transmissions, one transmission 102 formed from blocks A$_0$ 104, 106 repeated twice, and the second transmission 108 formed from blocks B$_0$ 110, 112 repeated twice. The first transmission is multiplied by a null phase ramp to form the superblock C$_0$ 114, for example:

$$C_0^{[n]} = \begin{cases} A_0^{[n]} & n = 0, 1, \ldots, L-1 \\ A_0^{[n-L]} & n = L, 1, \ldots, 2L-1 \end{cases},$$

$$= \begin{cases} A_0^{[n]} & n = 0, 1, \ldots, L-1 \\ A_0^{[n]} & n = 0, 1, \ldots, L-1 \end{cases}$$

while the second is multiplied by a phase ramp (that spans $2\pi$ radians) to form superblock $C_1$ 116, for example:

$$C_1^{[n]} = \begin{cases} B_0^{[n]} e^{\frac{j2\pi n}{2L}} & n = 0, 1, \ldots, L-1 \\ B_0^{[n-L]} e^{\frac{j2\pi n}{2L}} & n = L, 1, \ldots, 2L-1 \end{cases}$$

$$= \begin{cases} B_0^{[n]} e^{\frac{j2\pi n}{2L}} & n = 0, 1, \ldots, L-1 \\ B_0^{[n]} e^{\frac{j2\pi (n+L)}{2L}} & n = 0, 1, \ldots, L-1 \end{cases}$$

In this example, K is equal to 2.

Figure 2:
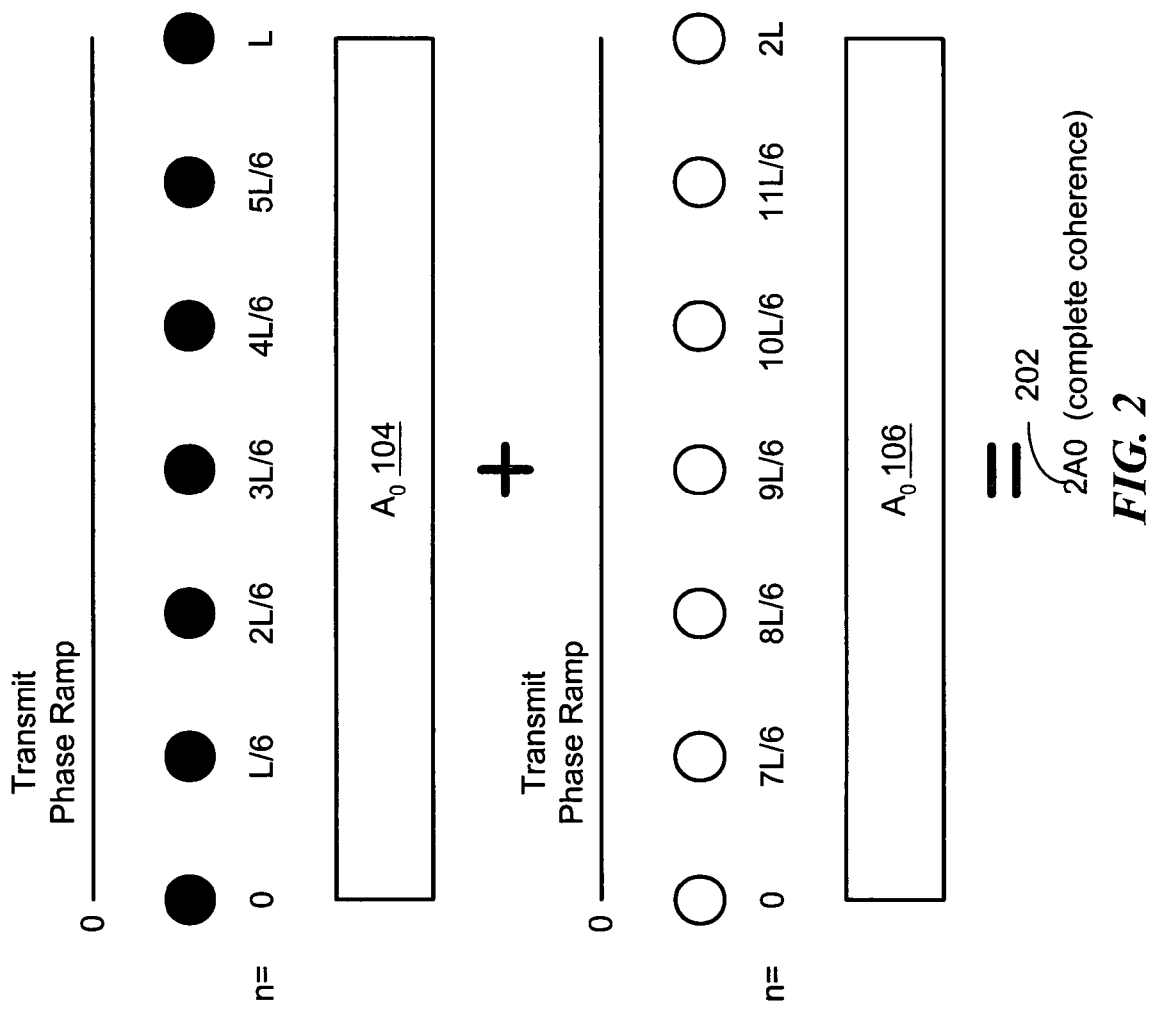
FIG. 2 shows that the combining of the two component block elements in $C_0$ of FIG. 1 is coherent, yielding an outcome $D_0$ that consists of the original block $A_0$ but with an amplification (SNR enhancement) of 2.

In FIG. 2, a graphical representation that shows that the combining of the two component block elements 104 and 106 in $C_0$ of FIG. 1 is coherent, yielding an outcome $D_0$ 202 that consists of the original block $A_0$ 104 but with an amplification (SNR enhancement) of $2A_0$, is shown. In this example, K is equal to 2.

Figure 3:
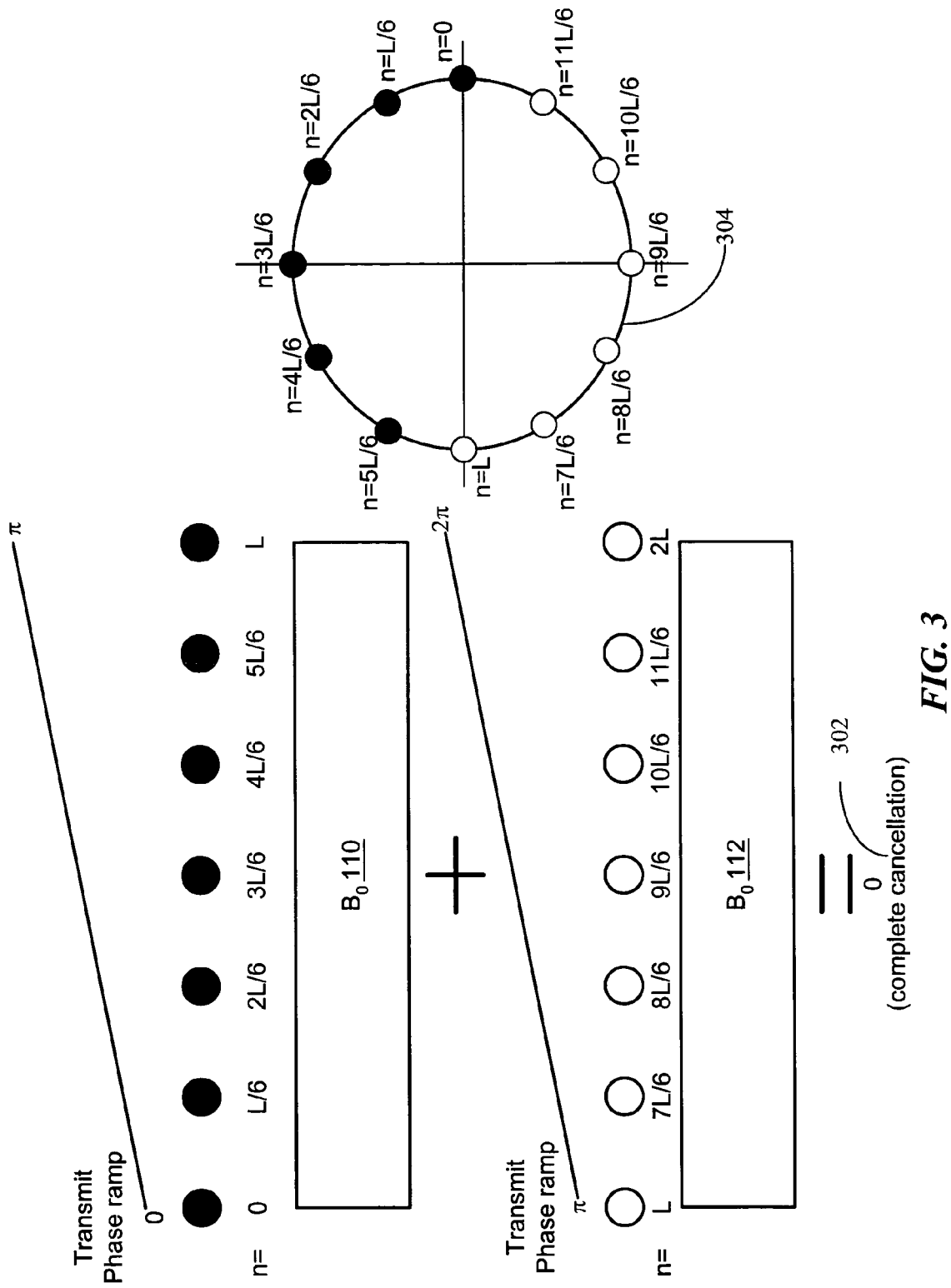
FIG. 3 shows that the combining the two component block elements in $C_1$ of FIG. 1 is incoherent (destructive), yielding an outcome $D_1$ that is zero.

In FIG. 3, a graphical representation that shows that the combining of the two component block elements 110 and 112 in $C_1$ of FIG. 1 is incoherent (destructive), yielding an outcome $D_1$ 302 that is zero, is shown. Phase ramp structure leads to complete cancellation of the $B_0$ block component elements 110 and 112. In this example, K is equal to 2.

The superposition (sum) of the $D_0$ 202 and $D_1$ 302 results indicates that if $C_0$ 114 and $C_1$ 116 were sent over the channel simultaneously, the combining-by-addition shown in FIGS. 2 and 3 yields an amplified version of block A, but no B:

coding. Thus, a single user may pour all of its energy into a reduced data rate stream without decreasing the signaling bandwidth or increasing the susceptibility to fading (as would be the case if all of the subscriber's unit's energy were funneled into a narrowband channel). System throughput is not sacrificed, because, although a single user's data rate may be reduced to 1/K of the full rate value, K−1 other users may also simultaneously transmit at that same data rate. This implementation example has the potential to increase a system's SNR link budget by $10 \log_{10}(K)$ without reducing system throughput.

The non-interfering signaling and reception of overlapping single carrier transmissions over delay spread channels also allows channel orthogonality that reduces power control requirements, and enables the simultaneous transmission of higher-order QAMs (such as 16- and 64-QAM in multi-user applications). By comparison, cellular CDMA only supports QPSK and BPSK encoding when larger spreading factors are used. When CDMA-2000 systems use 16-QAM, it only allows one user to occupy the channel. The channel orthogonality factor alone could increase channel utilization by several hundred percent at higher SNRs.

Wireless fidelity ("WiFi" or "Wi-Fi" as defined by IEEE 802.11) has demonstrated the attractiveness of a higher data rate (54 Mbps) with higher-bandwidth (20 MHz) channels, but suffers from poor range. Cellular systems offer better range, but receivers typically used in CDMA handsets become too complex for channels much broader than 1 MHz. Therefore, the equalization scheme is K-times less complex than the chip-level CDMA equalizers that are beginning to $$D_0[n] + D_1[n] = \underbrace{A_0[n] + A_0[n]}_{2A_0[n]} + \underbrace{B_0[n] e^{\frac{j2\pi n}{2L}} + B_0[n-L] e^{\frac{j2\pi(n+L)}{2L}}}_{B_0[n] e^{\frac{j2\pi n}{2L}} (1+e^{j\pi})=0}, \quad n = 0, 1, \ldots, L-1$$

$$= 2A_0[n], \quad n = 0, 1, \ldots, L-1$$

Figure 4:
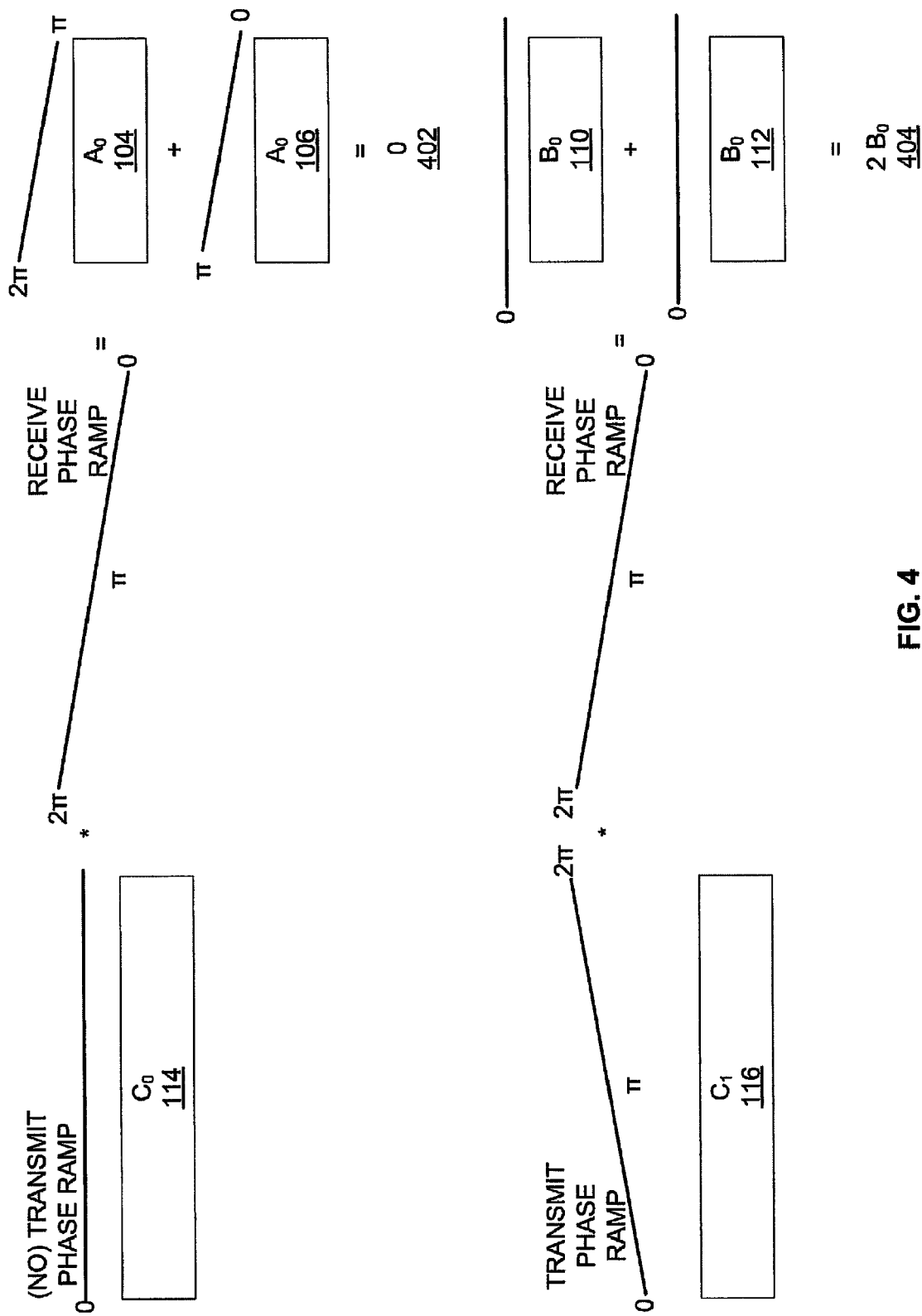
FIG. 4 shows how de-ramping is utilized to recover the second block $B_0$ of FIG. 1.

FIG. 4 is a graphical representation that shows that de-ramping may be utilized to recover the second block B. The left hand side of FIG. 4 illustrates the transmitted ramp and the equations 402 and 404 on the right illustrate the result of de-ramping. In this example, K is equal to 2.

As an example, the following is a result of de-ramping and combining block components. It is appreciated that the $A_0$ components 104 and 106 destructively interfere (post de-ramping), while the $B_0$ components 110 and 112 coherently combine (post-de-ramping), with an application of 2, as shown by:

appear in the technical literature, and outperforms chip-level CDMA equalizers and may also use a nonlinear decision feedback equalizer, while avoiding MAI. As a point of comparison, chip-level linear equalizers for CDMA systems may perform from 1-10 dB better than Rake receivers over broadband channels, and decision feedback equalizers can be 2-3 dB better (or more, depending on the multipath channel and code rate) than linear equalizers.

The implementation of non-interfering signaling and reception of overlapping single carrier transmissions over $$D_0^{rd}[n] = A_0[n] e^{\frac{-j2\pi n}{2L}} + A_0[n] e^{\frac{-j2\pi(n+L)}{2L}}, \quad n = 0, 1, \ldots L-1$$

$$D_1^{rd}[n] = B_0[n] + B_0[n], \quad n = 0, 1, \ldots, L-1$$

$$D_0^{rd}[n] + D_1^{rd}[n] = \underbrace{A_0[n] e^{\frac{-j2\pi n}{2L}} + A_0[n] e^{\frac{-j2\pi(n+L)}{2L}}}_{A_0[n] e^{\frac{-j2\pi n}{2L}} (1+e^{-j\pi})=0} + \underbrace{B_0[n] + B_0[n]}_{2B_0[n]}, \quad n = 0, 1, \ldots, L-1$$

$$= 2B_0[n], \quad n = 0, 1, \ldots, L-1$$

The implementation example of non-interfering signaling and reception of overlapping single carrier transmissions over delay spread channels increases range via block repetition delay spread channels outperforms the S-CDMA approach found in DOCSIS 2.0 specification, and may be implemented with relaxed timing constraints and a lower-cost receiver at the cable CMTS. It may also offer better ranging performance and reach compared to the mandatory TDMA ranging currently being used.

A pulse-shaping filter is a real-time filter, such as a square-root raised cosine filter, that band limits the transmitter output, thereby constraining it to occupy a finite bandwidth. Further, the pulse shape filtering is not translated up in frequency. Instead, input symbols are block-repeated and rotated by a linear phase ramp, then pulse shape filtered by a baseband-centered pulse-shaping filter, then (quadrature) upconverted to a carrier frequency. Note that this approach differs from an alternate approach, where the input signals are block repeated, then pulse-shape filtered, then upconverted by a small fixed frequency offset, and then quadrature upconverted to the carrier frequency. The second approach has a slightly different channel occupancy and slightly different frequency response from the first approach. Note that the first transmission approach favors a receiver that first match filters the input signal before performing phase de-ramping and block repetition averaging. The second approach favors a receiver that first applies a small subchannelization frequency offset, then match filters the signal, and then block repetition averages.

Figure 5:
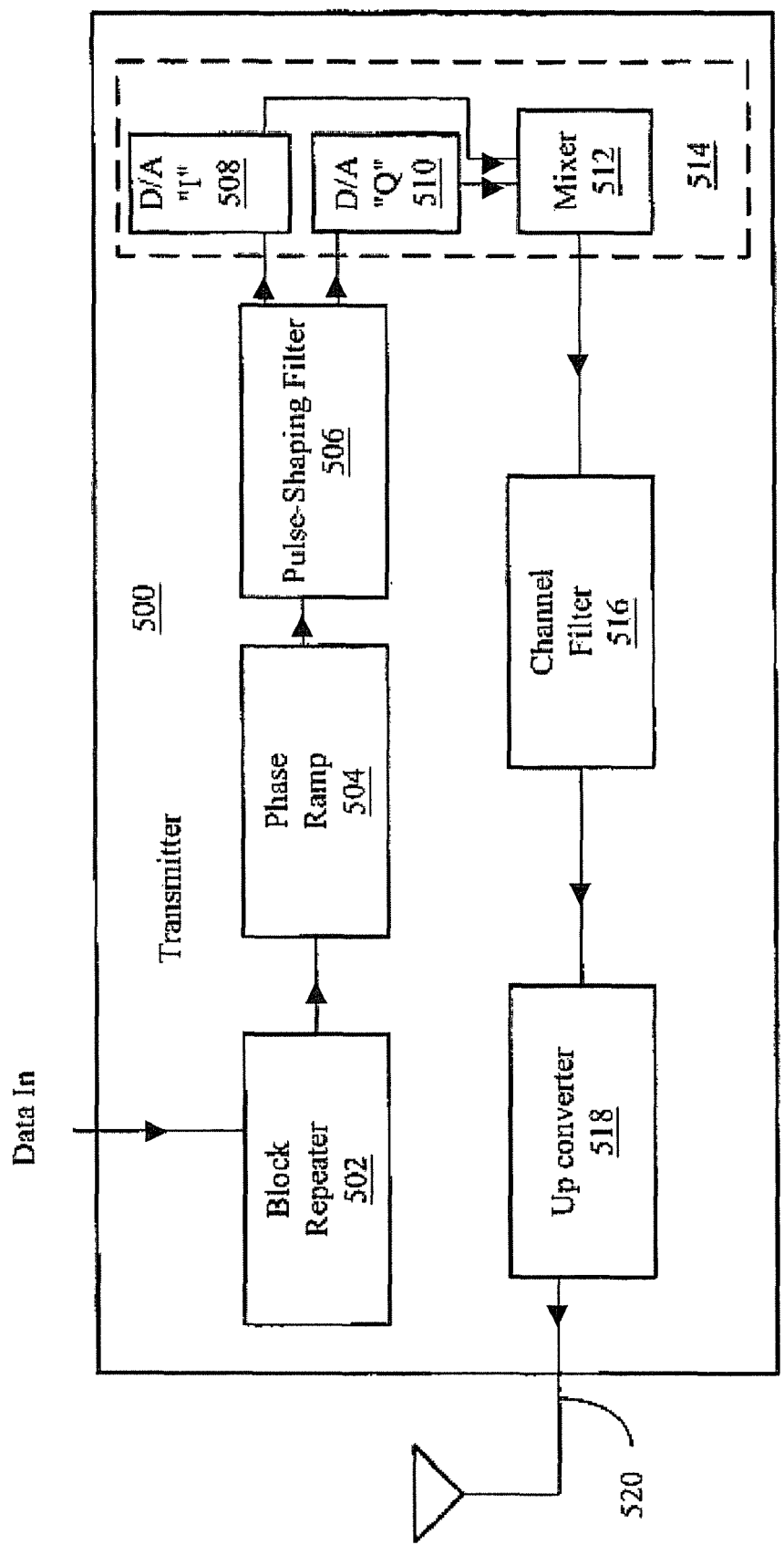
FIG. 5 is a block diagram of an example of an implementation of a transmitter that transmits the signal encoded as described in FIGS. 1-4.

In FIG. 5, a block diagram of a transmitter 500 that transmits a signal encoded as described in FIG. 1-FIG. 4 is shown. The transmitter 500 receives data and may include a block repeater 502, phase ramp 504, pulse-shaping filter 506, digital/analog in-phase ("I") converter 508, digital/analog quadrature ("Q) converter 510, mixer 512, channel filter 516, up converter 518, and antenna 520. Data may be received at the transmitter 500. The data is divided into blocks and the blocks are duplicated at the block repeater 502. The block repeater 502 is coupled to the phase ramp 504 and the duplicate blocks are transferred from the block repeater 502 to the phase ramp 504. The duplicate blocks are phase ramped by the phase ramp 504. The phase ramped signal is then shaped by the pulse-shaping filter 506, which is coupled to the phase ramp 504. The digital I and Q signals are separated after pulse shaping by the pulse-shaping filter 506. The digital I and Q signals are converted by a digital/analog I converter 508 and digital/analog Q converter 510. The analog Q and I components are then mixed by mixer 512. In another example of an implementation, a quadrature mixer acting on digital I and Q components 514 may be utilized.

The signal from the mixer 512 may then be received at a channel filter 516 that finishes the subchannelization. The subchannelized signal is then up converted by the up converter 518 and sent via antenna 520. In still another example of an implementation, the antenna 520 may be an array of antennas.

Figure 6:
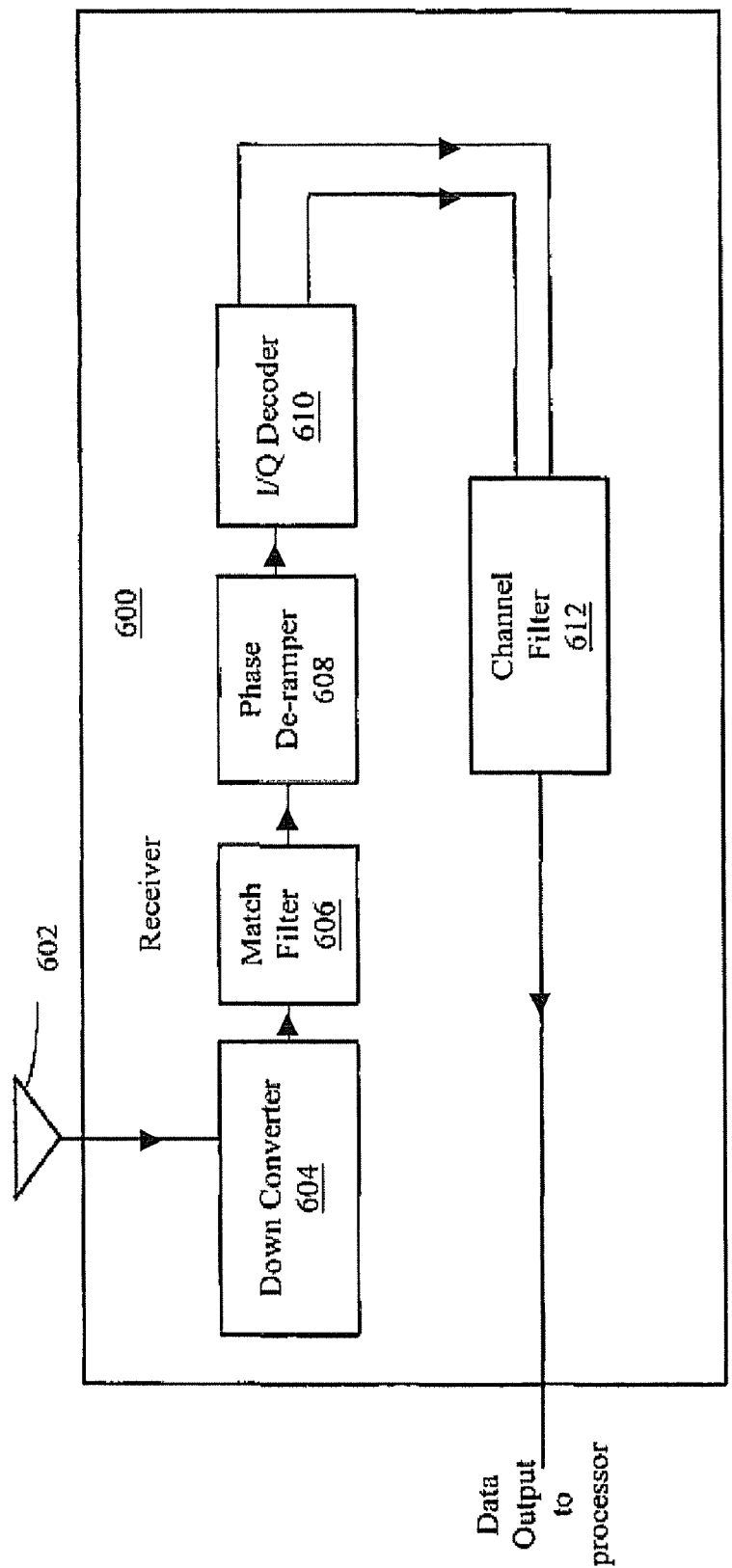
FIG. 6 is a block diagram of an example of an implementation of a receiver that receives the signal encoded as described in FIGS. 1-4.

Turning to FIG. 6, a block diagram of a receiver 600 that receives the signal encoded as described in FIG. 1-FIG. 4 is shown. The receiver 600 has an antenna 602, down converter 604, match filter 606, phase de-ramper 608, I/Q decoder 610, and channel filter 612. A subchannelized radio frequency signal is received at the receiver 600 via antenna 602. The signal is then down converted by down converter 604. The down converted signal is then passed through a match filter 606 and phase de-ramped by the phase de-ramper 608. The resulting phase de-ramped signal is then I/Q decoded by I/Q decoder 610. The decoded I and Q signals are then filtered by a channel filter 612 prior to the data being outputted by the receiver 600.

In the encoding process, the block repeat, phase ramp, channel filter, and then up convert—rather than block repeat, pulse-shape filter, frequency offset shift, and then up convert. This is because the receiver (which undoes/reverses the transmission process) then does not have to have a high-precision, high-speed frequency-shifter before the matched filter. The matched filter also normally performs a sample-rate conversion from a highly over-sampled input to a much lower rate input. If the precise frequency adjustment occurs before the matched filter, then the complexity of the receiver is typically much higher.

In FIG. 7, a flow diagram 700 of transmission of the encoded signaling of FIG. 1-FIG. 3 is shown. The flow diagram 700 starts 702 with the grouping of data into blocks of symbols of length N in step 704 in transmitter 500. Each block of N-symbols are repeated K times to form repetition-encoded super-blocks of length NK symbols in step 706. In step 708, the super-blocks are multiplied by a complex-valued phase ramp sequence of length NK where K is a set of different phase ramp sequences, where the phase ramp sequence is chosen from the set of different phase ramp sequences in step 710. A prefix is added to the beginning of the sequence with the last P symbols of the phase-ramped super-block in step 712. In step 714, the transmitter sends the phase ramped super-block and the process stops 716. It is appreciated by those skilled in the art that in practice, processing does not stop but is continuous.

Turning to FIG. 8, a flow diagram 800 of a receiver decoding a signal as described in FIG. 4 is shown. The receiver 600 starts 802 when the receiver receives the phase ramped super-block in step 804. The receiver 600 then discards the P-symbol prefix in step 806 and de-ramps the remaining length NK sequence in step 808. In step 810, the super-block is parsed into K blocks with each block having a length of N. In step 812, the single average block of length N is determined from the parsed super-blocks and processing is complete in step 814.

In the current example, subchannelization is used with eight subchannels in the uplink between the receiver and the base station. But, subchannelization may be employed in both the uplink and down link and with a different number of subchannels, such as 16 subchannels.

In an advanced antenna array system, preambles may be sent using subchannelization-formatted data. The subchannelization-formatted data may then be used at a receiver to distinguish the output of one antenna element in an antenna array from the output of other antenna elements in the array. In such an advanced antenna array system, each antenna element could transmit a preamble using a different subchannel.

Figure 9:
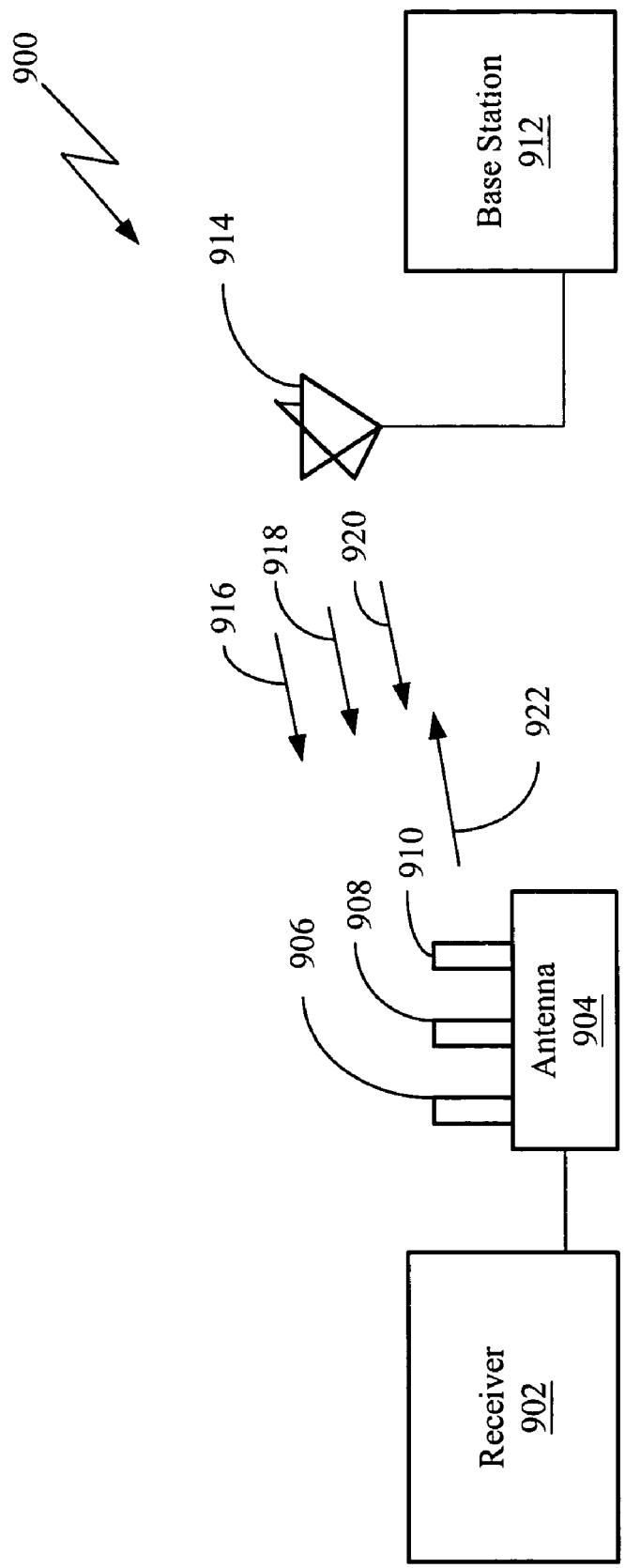
FIG. 9 is a block diagram of an example of an implementation of a receiver having an antenna array utilized to receive subchannalized signals from a base station.

In FIG. 9, an advanced antenna array system 900 is shown. A receiver 902 is in signal communication with an antenna 904 having three elements 906, 908, and 910. The receiver is in communication with a base station 912 that also has an antenna array 914. The base station 912 may send subchannelized signals 916, 918 and 920 over a channel to be received at the receiver's 902 antenna elements 906, 908 and 910. The receiver 902 may decode each subchannelized signal, determine its power level and carrier phase angle, and transmit a feedback message 922 back to the base station 912 indicating these measured parameters. Because the carrier phase and power level associated with each antenna element 906, 908 and 910 are identified by the receiver 902 and reported back to the base station 912, the base station 912 may use this information in subsequent transmissions (of data packets, rather than preamble probes) to 'phase its array' and focus a high power signal directly at the receiver's spatial location. Phasing the array involves amplifying gain and phase corrections to the individual antenna array elements so that their transmissions cohere (i.e., have the same phase angle) at the receiver. In other antenna array systems, subchannelization may be employed on other signals in additional to the probe signal.

Persons skilled in the art will understand and appreciate, that one or more processes, sub-processes, or process steps described may be performed by hardware and/or software. Additionally, the controller may be implemented completely in software that would be executed within a microprocessor, general-purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Persons skilled in the art also will understand and appreciate, that the communications system described that utilizes non-interfering signaling and reception of overlapping single carrier transmissions over delay spread channels may be utilized or integrated into a number of architectures, such as personal data assistant ("PDA"), television, set-top box, computing device, telephone, printer, server, house, office, automobile, bus, truck, motorcycle, and/or airplane.

It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A method comprising:
   grouping data, by a transmitter, into a block of symbols;
   repeating the block of symbols a predetermined number of times to form a repetition-encoded super-block;
   multiplying the repetition-encoded super-block by a complex-valued phase ramp sequence resulting in a sequence, wherein the complex-valued phase ramp sequence is chosen from a set of different phase ramp sequences;
   adding a symbol prefix at the beginning of the sequence, resulting in a phase-ramped super-block;
   transmitting, by the transmitter, the phase-ramped super-block;
   receiving, by a receiver, a received phase-ramped super-block from the transmitter;
   discarding the symbol prefix of the received phase-ramped super-block resulting in a received sequence;
   de-ramping the received sequence resulting in a received super-block;
   parsing the received super-block into a predetermined number of parsed blocks; and
   determining a single average block from the predetermined number of parsed blocks.

2. The method of claim 1, further comprising pulse-shaping filtering of the phase-ramped super-block.

3. The method of claim 1, further comprising match filtering the received phase-ramped super-block prior to de-ramping the received sequence at the receiver.

4. The method of claim 1, further comprising transmitting the phase-ramped super-block at an antenna array wherein the phase-ramped super-block is a probe signal.

5. A method comprising:
   grouping data, by a transmitter, into a block of symbols;
   repeating the block of symbols a predetermined number of times to form a repetition-encoded super-block;
   multiplying the repetition-encoded super-block by a complex-value phase ramp sequence resulting in a sequence, wherein the complex-valued phase ramp sequence is chosen from a set of different phase ramp sequences;
   adding a symbol prefix at the beginning of the sequence resulting in a phase-ramped super-block; and
   transmitting, by the transmitter, the phase-ramped super-block.

6. The method of claim 5, wherein the set of different phase ramp sequences contains a predetermined number of phase ramp sequences.

7. The method of claim 5, wherein the block of symbols contains the symbol prefix.

8. A method comprising:
   receiving, by a receiver, a received phase-ramped super-block from a transmitter, wherein the phase-ramped super-block has a symbol prefix;
   discarding the symbol prefix resulting in a received sequence;
   de-ramping the received sequence resulting in a received super-block;
   parsing the received super-block into a predetermined number of parsed blocks; and
   determining a single average block from the predetermined number of parsed blocks.

9. The method of claim 8, further comprising processing the received phase-ramped super-block in the time domain.

10. A system, comprising:
    a transmitter comprising:
    a block repeater configured to group data into a block of symbols and repeat the block of symbols a predetermined number of times to form a repetition-encoded super-block; and
    a phase ramper configured to multiply the repetition-encoded super-block by a complex-valued phase ramp sequence resulting in a sequence, wherein the complex-valued phase ramp sequence is chosen from a set of different phase ramp sequences, and wherein a prefix sequence having a symbol prefix is added to the beginning of the sequence resulting in a phase-ramped super-block; and a receiver configured to receive a received phase-ramped super-block from the transmitter having a received prefix sequence;

the receiver comprising:

a phase de-ramper configured to discard that discards the received prefix sequence resulting in a received sequence and de-ramp the received sequence resulting in a received super-block, and further configured to parse the received super-block into a predetermined number of parsed blocks, and to determine a single average block from the predetermined number of parsed blocks.

11. The system of claim 10, wherein the transmitter further comprises a pulse-shaping filter configured to filter the phase-ramped super-block.

12. The system of claim 10, wherein the receiver further comprises a matched filter configured to filter the received phase-ramped super-block prior to the phase de-ramper de-ramping the received sequence.

13. The system of claim 10, wherein the transmitter further comprises an antenna array configured to transmit the phase-ramped super-block, wherein the phase-ramped super-block is a probe signal.

14. A transmitter comprising:

a block repeater configured to group data into a block of symbols and repeat the block of symbols a predetermined number of times to form a repetition-encoded super-block; and a phase ramper configured to multiply a complex-value phase ramp sequence by the repetition-encoded super-block resulting in a sequence, wherein the complex-valued phase ramp sequence is chosen from a set of different phase ramp sequences, and wherein a prefix sequence having a symbol prefix is added to the beginning of the sequence resulting in a phase-ramped super-block.

15. The transmitter of claim 14, wherein the block of symbols contains the symbol prefix.

16. A receiver, comprising:

the receiver configured to receive a received phase-ramped super-block from a transmitter having a received prefix sequence;

a phase de-ramper configured to:

discard the received prefix sequence resulting in a received sequence;

de-ramp the received sequence resulting in a received super-block;

parse the received super-block into a predetermined number of parsed blocks; and to determine a single average block from the predetermined number of parsed blocks.

17. The receiver of claim 16, wherein the received phase-ramped super-block is processed in the time domain.

18. A tangible computer-readable medium having non-transitory computer-executable instructions that, in response to execution by a computing device, cause the computing device to perform operations, the instructions comprising:

instructions for grouping data into a block of symbols;

instructions for repeating the block of symbols a predetermined number of times to form a repetition-encoded super-block;

instructions for multiplying the repetition-encoded super-block by a complex-valued phase ramp sequence resulting in a sequence, wherein the complex-valued phase ramp is chosen from a set of different phase ramp sequences;

instructions for adding a symbol prefix at the beginning of the sequence resulting in a phase-ramped super-block;

instructions for transmitting the phase-ramped super-block;

instructions for receiving a received phase-ramped super block;

instructions for discarding the symbol prefix of the received phase-ramped super-block resulting in a received sequence;

instructions for de-ramping the received sequence resulting in a received super-block;

instructions for parsing the received super-block into a predetermined number of parsed blocks;

and instructions for determining a single average block from the predetermined number of parsed blocks.

19. The computer-readable medium of claim 18, further comprising instructions for pulse-shaping filtering the phase-ramped super-block.

20. The computer-readable medium of claim 18, further comprising instructions for transmitting the phase-ramped super-block at an antenna array wherein the phase-ramped super-block is a probe signal.

21. A tangible computer-readable medium having non-transitory computer-executable instructions that, in response to execution by a computing device, cause the computing device to perform operations, the instructions comprising:

instructions for grouping data into a block of symbols, and repeating the block of symbols a predetermined number of times to form a repetition-encoded super-block;

instructions for selecting a phase ramp sequence from a set of phase ramp sequences;

instructions for multiplying the repetition-encoded super-blockby the phase ramp sequence resulting in a sequence;

instructions for adding a symbol prefix at the beginning of the sequence resulting in a phase-ramped super-block; and instructions for transmitting the phase-ramped super-block.

22. The computer-readable medium of claim 21, wherein the set of phase ramp sequences contains a predetermined number of phase ramp sequences.

23. A tangible computer-readable medium having non-transitory computer-executable instructions that, in response to execution by a computing device, cause the computing device to perform operations, the instructions comprising:

instructions for receiving a received phase-ramped super-block having a symbol prefix;

instructions for discarding the symbol prefix resulting in a received sequence;

instructions for de-ramping the received sequence into a received super-block;

instructions for parsing the received super-block into a predetermined number of parsed blocks; and instructions for determining a single average block from the predetermined number of parsed blocks.

24. The computer-readable medium of claim 23, further comprising instructions for processing the received phase-ramped super-block in the time domain.

* * * * *

UNITED STATES PATENT AND TRADEMARK OFFICE
CERTIFICATE OF CORRECTION

PATENT NO.         : 7,885,350 B1
APPLICATION NO.    : 11/239657
DATED              : February 8, 2011
INVENTOR(S)        : Eidson Page 1 of 1

It is certified that error appears in the above-identified patent and that said Letters Patent is hereby corrected as shown below:

Column 12, lines 32-33, in Claim 5, delete "complex-value" and insert -- complex-valued --.

Column 13, line 10, in Claim 10, after "discard" delete "that discards".

Column 13, line 33, in Claim 14, delete "complex-value" and insert -- complex-valued --.

Column 13, line 54, in Claim 16, before "determine" delete "to".

Column 14, lines 10-11, in Claim 18, delete "super block;" and insert -- super-block; --.

Column 14, lines 37-38, in Claim 21, delete "super-blockby" and insert -- super-block by --.

Signed and Sealed this
Seventh Day of June, 2011

David J. Kappos
*Director of the United States Patent and Trademark Office*